US012670156B2

(12) United States Patent
Colmenares Diaz et al.

(10) Patent No.: US 12,670,156 B2
(45) Date of Patent: Jun. 30, 2026

(54) TECHNIQUES FOR BUILDING OR QUERYING GRAPH MODEL OF DATA STORED IN A COMMON DATA FORMAT

(71) Applicant: Microsoft Technology Licensing, LLC, Redmond, WA (US)

(72) Inventors: Juan Andres Colmenares Diaz, Santa Clara, CA (US); Santosh Balasubramanian, Seattle, WA (US); Joshua Shinavier, San Jose, CA (US); Yuanyuan Tian, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/679,250

(22) Filed: May 30, 2024

(65) Prior Publication Data

US 2025/0371001 A1    Dec. 4, 2025

(51) Int. Cl.
*G06F 16/20* (2019.01)
*G06F 16/22* (2019.01)
*G06F 16/245* (2019.01)
*G06F 16/2452* (2019.01)
*G06F 16/2453* (2019.01)

(52) U.S. Cl.
CPC .... *G06F 16/24526* (2019.01); *G06F 16/2228* (2019.01); *G06F 16/2453* (2019.01); *G06F 16/24569* (2019.01)

(58) Field of Classification Search
CPC ......... G06F 16/24526; G06F 16/24569; G06F 16/2228; G06F 16/2453
USPC .......................... 707/736, 737, 748, 758, 769
See application file for complete search history.

(56) References Cited

U.S. PATENT DOCUMENTS

| | | | | |
|---|---|---|---|---|
| 9,280,581 | B1 | 3/2016 | Grimes | |
| 10,628,421 | B2 * | 4/2020 | Devarao | ............... G06F 16/212 |
| 10,901,973 | B1 | 1/2021 | Senra | |
| 11,216,455 | B2 * | 1/2022 | Tong | ..................... G06F 16/287 |

(Continued)

FOREIGN PATENT DOCUMENTS

| | | | |
|---|---|---|---|
| CN | 1180355502 A | 5/2024 | |
| WO | WO2009/149262 A1 * | 12/2009 | |

(Continued)

OTHER PUBLICATIONS

Non-Final Office Action mailed on Feb. 7, 2025, in U.S. Appl. No. 18/658,751, 33 Pages.

(Continued)

*Primary Examiner* — Daniel A Kuddus
(74) *Attorney, Agent, or Firm* — ArentFox Schiff LLP

(57) ABSTRACT

Described are examples for creating a graph model for data obtained from multiple data sources and stored in a common data format. A selection of columns of data stored in the common data format that are to be associated with one another in the graph model can be obtained. Based on the selection, a graph model can be created including metadata that defines a list of vertices corresponding to at least a portion of the columns and a list of edges between two or more of the vertices identifying a relationship between corresponding columns. A graph query or graph algorithm can be performed over the graph model of the data as stored in the common data format without requiring copying of the data to a separate graph database.

15 Claims, 7 Drawing Sheets

(56) References Cited

U.S. PATENT DOCUMENTS

| | | | |
|---|---|---|---|
| 11,656,868 B1 | 5/2023 | Gottlob | |
| 2004/0204838 A1* | 10/2004 | Chen ................. | G01C 21/3446 |
| | | | 340/995.19 |
| 2008/0168071 A1 | 7/2008 | Dykes | |
| 2010/0031162 A1 | 2/2010 | Wiser et al. | |
| 2010/0031165 A1 | 2/2010 | Lindquist | |
| 2016/0071233 A1* | 3/2016 | Macko .................... | G06T 11/26 |
| | | | 345/440 |
| 2016/0342708 A1* | 11/2016 | Fokoue-Nkoutche ........................ | |
| | | | G06F 16/9024 |
| 2017/0068748 A1* | 3/2017 | Hu ....................... | G06F 16/9017 |
| 2017/0193016 A1 | 7/2017 | Kulkarni | |
| 2017/0364534 A1* | 12/2017 | Zhang .................. | G06F 16/284 |
| 2018/0011945 A1 | 1/2018 | Vaquero Gonzalez | |
| 2018/0039710 A1 | 2/2018 | Chen et al. | |
| 2018/0225314 A1* | 8/2018 | Devarao ............. | G06F 16/2455 |
| 2019/0121810 A1* | 4/2019 | Zhuang ................. | G06F 16/213 |
| 2019/0171655 A1 | 6/2019 | Psota et al. | |
| 2020/0201909 A1 | 6/2020 | Das et al. | |
| 2021/0056104 A1* | 2/2021 | Tong .................... | G06F 16/2282 |
| 2021/0253063 A1* | 8/2021 | Pupillo ................. | B60R 25/102 |
| 2021/0256053 A1 | 8/2021 | Shashidhar | |
| 2021/0256063 A1* | 8/2021 | Kasperovics ....... | G06F 16/9024 |
| 2022/0138262 A1 | 5/2022 | Yan | |
| 2022/0245147 A1 | 8/2022 | Segalini | |
| 2023/0175856 A1* | 6/2023 | Khoe ..................... | G01C 21/34 |
| | | | 701/117 |
| 2023/0176856 A1* | 6/2023 | Khare ....................... | G06F 8/65 |
| | | | 707/624 |
| 2023/0267120 A1* | 8/2023 | Kapp ...................... | G06F 16/28 |
| | | | 707/717 |
| 2025/0348474 A1 | 11/2025 | Balasubramanian | |
| 2025/0348515 A1 | 11/2025 | Balasubramanian | |
| 2025/0384042 A1 | 12/2025 | Colmenares Diaz | |

FOREIGN PATENT DOCUMENTS

| | | | |
|---|---|---|---|
| WO | WO2019149262 A1 | * | 12/2009 |
| WO | 2024157776 A1 | | 8/2024 |

OTHER PUBLICATIONS

Non-Final Office Action mailed on May 20, 2025, in U.S. Appl. No. 18/744,242, 12 pages.

Non-final office action mailed on Jun. 4, 2025, in U.S. Appl. No. 18/658,800, 32 pages.

Extended European search report received for European Application No. 251744470, mailed on Aug. 18, 2025, 9 Pages.

Koutras, et al., "OmniMatch: Effective Self-Supervised Any-Join Discovew in Tabular Data Repositories", Retrieved from: https://arxiv.org/abs/2403.07653, Mar. 12, 2024, 14 Pages.

Notice of Allowance mailed on Oct. 15, 2025, in U.S. Appl. No. 18/658,751, 08 pages.

Notice of Allowance mailed on Sep. 30, 2025, in U.S. Appl. No. 18/658,800, 05 pages.

Extended European search report received in European Application No. 25176679.6, mailed on Jul. 30, 2025, 12 pages.

Final Office Action mailed on Jul. 15, 2025, in U.S. Appl. No. 18/658,751, 11 pages.

Communication pursuant to Rule 69 EPC—reminder concerning payment of the designation fee (Art. 79(2) EPC) and of the examination fee (Art. 94(1) EPC)—and invitation pursuant to Rule 70a(1), Received in European Patent Application No. 25176679.6 (MS# 501907-EP01), mailed on Dec. 8, 2025, 02 pages.

Notice of Allowance mailed on Dec. 29, 2025, in U.S. Appl. No. 18/744,242, 07 pages.

* cited by examiner

400 ⟶

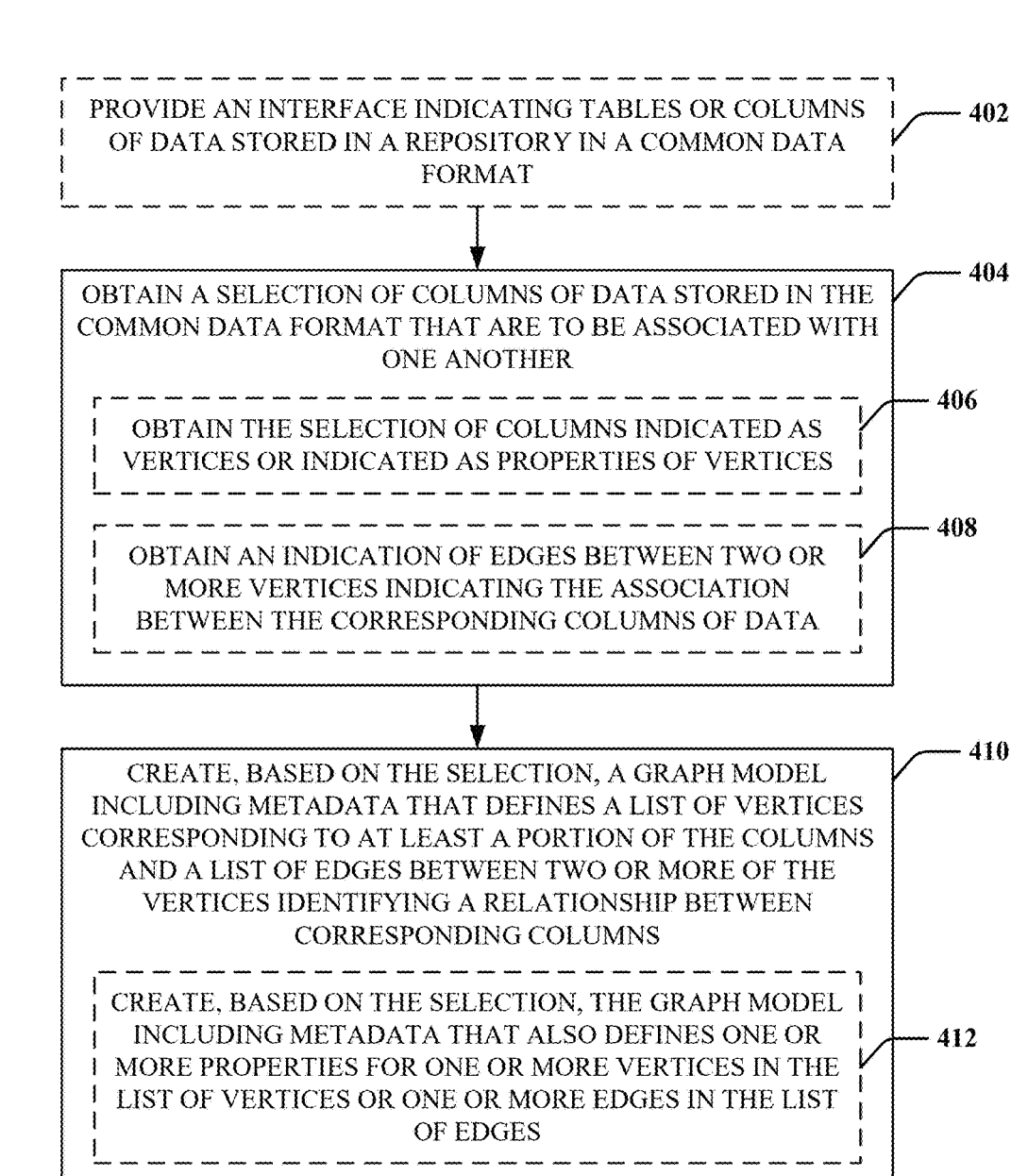

PROVIDE AN INTERFACE INDICATING TABLES OR COLUMNS OF DATA STORED IN A REPOSITORY IN A COMMON DATA FORMAT — 402

OBTAIN A SELECTION OF COLUMNS OF DATA STORED IN THE COMMON DATA FORMAT THAT ARE TO BE ASSOCIATED WITH ONE ANOTHER — 404

OBTAIN THE SELECTION OF COLUMNS INDICATED AS VERTICES OR INDICATED AS PROPERTIES OF VERTICES — 406

OBTAIN AN INDICATION OF EDGES BETWEEN TWO OR MORE VERTICES INDICATING THE ASSOCIATION BETWEEN THE CORRESPONDING COLUMNS OF DATA — 408

CREATE, BASED ON THE SELECTION, A GRAPH MODEL INCLUDING METADATA THAT DEFINES A LIST OF VERTICES CORRESPONDING TO AT LEAST A PORTION OF THE COLUMNS AND A LIST OF EDGES BETWEEN TWO OR MORE OF THE VERTICES IDENTIFYING A RELATIONSHIP BETWEEN CORRESPONDING COLUMNS — 410

CREATE, BASED ON THE SELECTION, THE GRAPH MODEL INCLUDING METADATA THAT ALSO DEFINES ONE OR MORE PROPERTIES FOR ONE OR MORE VERTICES IN THE LIST OF VERTICES OR ONE OR MORE EDGES IN THE LIST OF EDGES — 412

Figure 5:
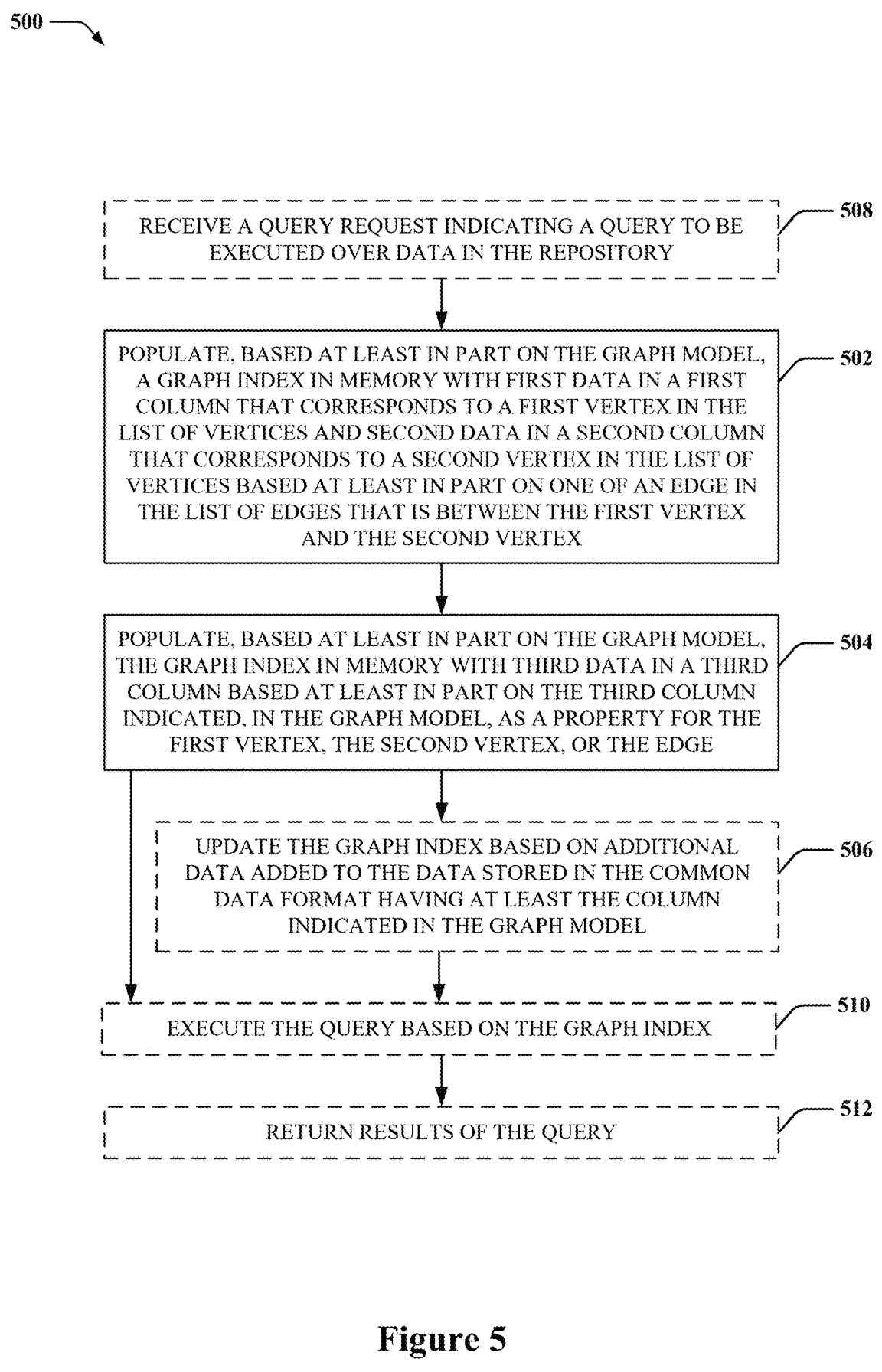

RECEIVE A QUERY REQUEST INDICATING A QUERY TO BE EXECUTED OVER DATA IN THE REPOSITORY — 508

POPULATE, BASED AT LEAST IN PART ON THE GRAPH MODEL, A GRAPH INDEX IN MEMORY WITH FIRST DATA IN A FIRST COLUMN THAT CORRESPONDS TO A FIRST VERTEX IN THE LIST OF VERTICES AND SECOND DATA IN A SECOND COLUMN THAT CORRESPONDS TO A SECOND VERTEX IN THE LIST OF VERTICES BASED AT LEAST IN PART ON ONE OF AN EDGE IN THE LIST OF EDGES THAT IS BETWEEN THE FIRST VERTEX AND THE SECOND VERTEX — 502

POPULATE, BASED AT LEAST IN PART ON THE GRAPH MODEL, THE GRAPH INDEX IN MEMORY WITH THIRD DATA IN A THIRD COLUMN BASED AT LEAST IN PART ON THE THIRD COLUMN INDICATED, IN THE GRAPH MODEL, AS A PROPERTY FOR THE FIRST VERTEX, THE SECOND VERTEX, OR THE EDGE — 504

UPDATE THE GRAPH INDEX BASED ON ADDITIONAL DATA ADDED TO THE DATA STORED IN THE COMMON DATA FORMAT HAVING AT LEAST THE COLUMN INDICATED IN THE GRAPH MODEL — 506

EXECUTE THE QUERY BASED ON THE GRAPH INDEX — 510

RETURN RESULTS OF THE QUERY — 512

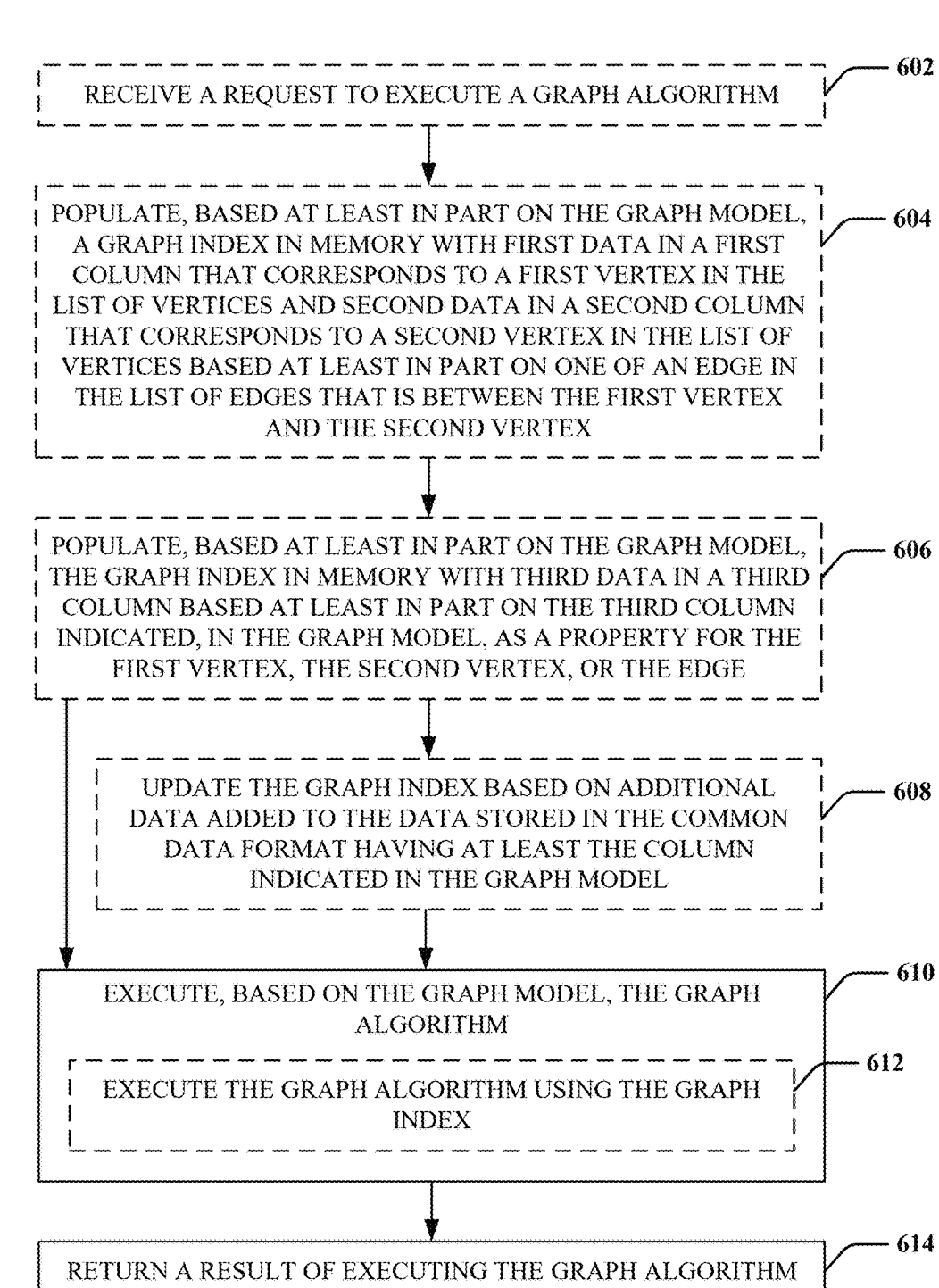

RECEIVE A REQUEST TO EXECUTE A GRAPH ALGORITHM — 602

POPULATE, BASED AT LEAST IN PART ON THE GRAPH MODEL, A GRAPH INDEX IN MEMORY WITH FIRST DATA IN A FIRST COLUMN THAT CORRESPONDS TO A FIRST VERTEX IN THE LIST OF VERTICES AND SECOND DATA IN A SECOND COLUMN THAT CORRESPONDS TO A SECOND VERTEX IN THE LIST OF VERTICES BASED AT LEAST IN PART ON ONE OF AN EDGE IN THE LIST OF EDGES THAT IS BETWEEN THE FIRST VERTEX AND THE SECOND VERTEX — 604

POPULATE, BASED AT LEAST IN PART ON THE GRAPH MODEL, THE GRAPH INDEX IN MEMORY WITH THIRD DATA IN A THIRD COLUMN BASED AT LEAST IN PART ON THE THIRD COLUMN INDICATED, IN THE GRAPH MODEL, AS A PROPERTY FOR THE FIRST VERTEX, THE SECOND VERTEX, OR THE EDGE — 606

UPDATE THE GRAPH INDEX BASED ON ADDITIONAL DATA ADDED TO THE DATA STORED IN THE COMMON DATA FORMAT HAVING AT LEAST THE COLUMN INDICATED IN THE GRAPH MODEL — 608

EXECUTE, BASED ON THE GRAPH MODEL, THE GRAPH ALGORITHM — 610

EXECUTE THE GRAPH ALGORITHM USING THE GRAPH INDEX — 612

RETURN A RESULT OF EXECUTING THE GRAPH ALGORITHM — 614

Figure 6

TECHNIQUES FOR BUILDING OR QUERYING GRAPH MODEL OF DATA STORED IN A COMMON DATA FORMAT

BACKGROUND

Graph databases have been provided for describing a structure of a database as a collection of vertices (or nodes) and edges, where the edges describe a relationship between vertices. Graph models offer a powerful tool for data analysis by allowing queries that explore the relationships among data elements. Conventional approaches to using graph models involve constructing a graph database for source data by performing extract, transform, and load (ETL) processes to create and store a separate copy of the source data in the graph database. Such processes are resource intensive, as requiring processing resources to perform the ETL processes and additional storage resources to store the copy of the source data in the graph database. In addition, constructing a graph database in this regard may also result in multiple copies of the data that need to be managed.

Data lakes are also provided as centralized repositories for ingesting and storing large volumes of data from an original format. The data can then be processed and used as a basis for a variety of analytic needs. Due to its open, scalable architecture, a data lake can accommodate all types of data from substantially any source, from structured data sources (e.g., database tables and spreadsheets) to semi-structured (e.g., extensible Markup Language (XML) files and webpages) to unstructured (images, audio files, and tweets), without sacrificing fidelity. The data files can be stored in staged zones, e.g., raw, cleansed, and curated, so that different types of users may use the data in its various forms to meet their needs. Data lakes provide core data consistency across a variety of applications, powering big data analytics, machine learning, predictive analytics, and other forms of intelligent action. In some cases, data lakes can store the data in a common data format, such as parquet and its derivatives delta, Hudi, and Iceberg.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, a device for creating a graph model for data obtained from multiple data sources and stored in a common data format is provided. The device includes one or more memories storing instructions, and one or more processors coupled to the one or more memories. The one or more processors are configured to execute the instructions to obtain a selection of columns of data stored in the common data format that are to be associated with one another in the graph model, create, based on the selection, a graph model including metadata that defines a list of vertices corresponding to at least a portion of the columns and a list of edges between two or more of the vertices identifying a relationship between corresponding columns, and one of perform a graph query or perform a graph algorithm over the graph model of the data as stored in the common data format.

In another example, a computer-implemented method of creating a graph model for data obtained from multiple data sources and stored in a common data format is provided. The method includes creating, based on a selection of columns of data stored in the common data format that are to be associated with one another, a graph model including metadata that defines a list of vertices corresponding to at least a portion of the columns and a list of edges between two or more of the vertices identifying a relationship between corresponding columns, and one of performing a graph query or performing a graph algorithm over the graph model of the data as stored in the common data format.

In another example, one or more non-transitory computer-readable media are provided for storing instructions thereon that, when executed by at least one computing device, cause the at least one computing device to perform operations for creating a graph model for data obtained from multiple data sources and stored in a common data format. The operations include obtaining a selection of columns of data stored in the common data format that are to be associated with one another in the graph model, creating, based on the selection, a graph model including metadata that defines a list of vertices corresponding to at least a portion of the columns and a list of edges between two or more of the vertices identifying a relationship between corresponding columns, and one of performing a graph query or performing a graph algorithm over the graph model of the data as stored in the common data format.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4 is a flow diagram of an example of a method for creating a graph model over data stored in a data repository according to a common data format, in accordance with aspects described herein.

FIG. 5 is a flow diagram of an example of a method for populating a graph index corresponding to one or more graph models for executing queries on the one or more graph models, in accordance with aspects described herein.

FIG. 6 is a flow diagram of an example of a method for executing a graph algorithm for the one or more graph models, in accordance with aspects described herein.

DETAILED DESCRIPTION

Figure 1:
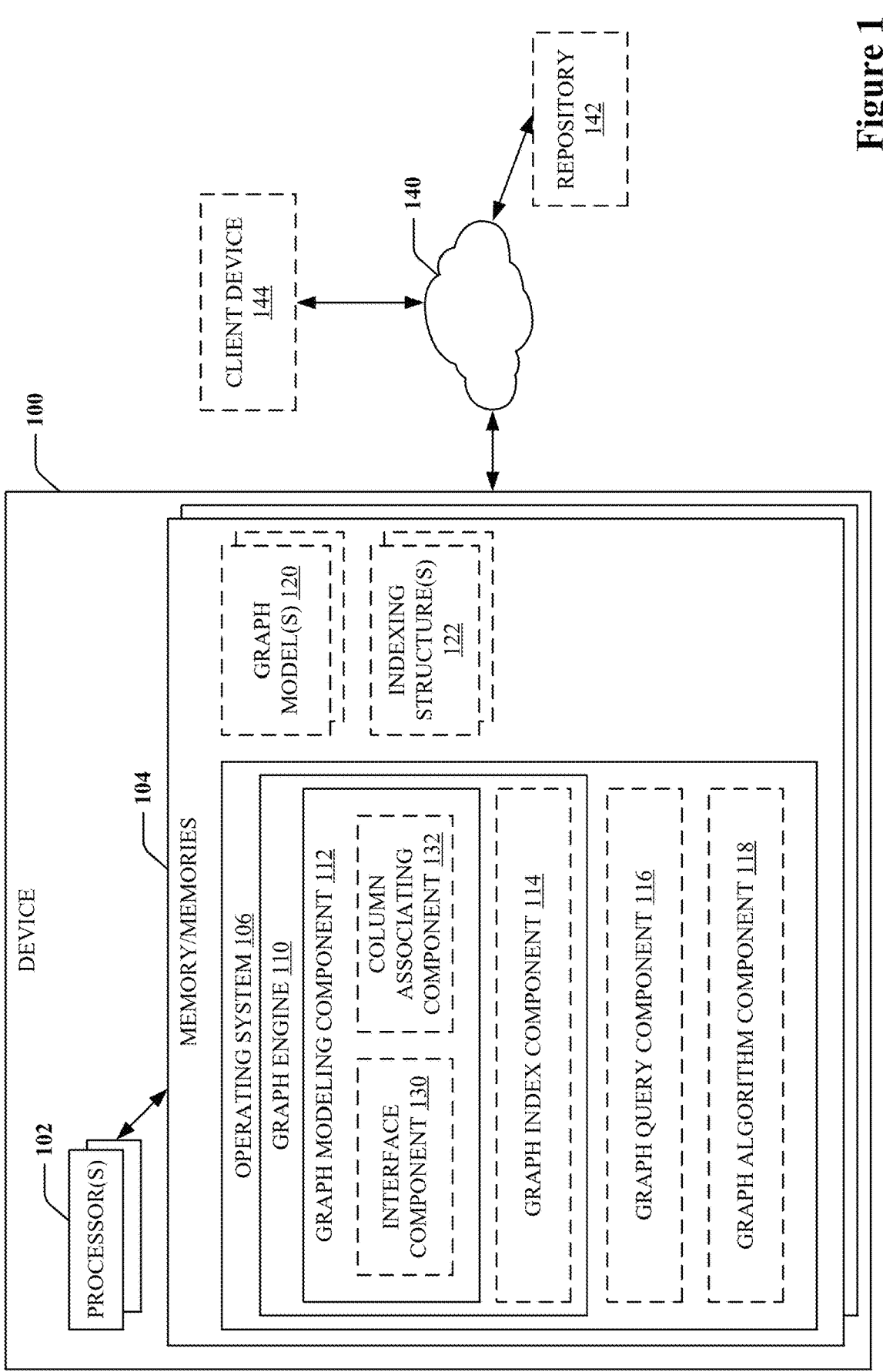
FIG. 1 is a schematic diagram of an example of a device for performing functions related to generating, querying, or otherwise utilizing a graph model over data stored in a repository in a common data format, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to providing a graph model for data stored in a repository according to a common data format. In some examples, the data can be stored in a data lake in a common data format, such as parquet (e.g., delta, Hudi, Iceberg, etc.). The data stored in the data lake may be of a row and column format, such that the data can be instances (e.g., rows) of data with values for multiple parameters (e.g., columns). In an example, the data lake can be stored by a storage device or by multiple storage devices or other resources in a cloud-computing environment. In accordance with aspects described herein, a graph model can be defined over the data stored in the data lake without requiring the data to be copied to a separate graph database. In accordance with additional aspects described herein, graph queries or algorithms can be executed over the data stored in the data lake without requiring the data to be copied to the graph database (e.g., without requiring performing extract, transform, and load (ETL) processes). This can conserve processing and storage resources.

For example, the graph model can be defined in metadata that describes a list of vertices, which can correspond to columns in the data stored in one or more databases or data stores that are part of the data lake, and a list of edges, which can describe relationships among the vertices (e.g., among the corresponding columns). In an example, a graphical user interface (GUI) can be used to specify the graph model, by providing a mechanism to specify which columns of which databases or data stores are to be associated with one another. In addition, for example, the graph model can define one or more other columns as properties for a given column, which may also be specified via the GUI. In this regard, for example, the graph model can be created, visualized, updated by no-code/low-code users and/or code-first users using a software as a service (SaaS) experience. In an example, the GUI can list various sources of data in the data lake along with tables and/or columns in the data, and/or can allow for selecting various columns to be related to one another in generating a graph model. The graph model can accordingly be defined based on selection via the interface of the columns of data to be associated with one another in the graph model. In some examples, the graph model definition can be shared to different users in an organization. In addition, in some examples, the graph model can be used by different graph workloads such as analytics and algorithms. The graph model can exist as the definition of relationships between columns without requiring copying of the data from the related columns into another data store.

With the graph model defined, one or more graph queries or graph algorithms can be executed over the data stored in the repository (e.g., the data lake) in the common format to provide efficient and robust query results. This may also occur without performing ETL of the data to a separate graph database. For example, when a query is executed, the data from the data lake can be stored in a local memory (e.g., random access memory or RAM) to execute the query. This process can include hydrating, based on values in the query, an index with relevant data from the data lake into RAM based on relationships in the graph model. Then, the query can be executed on the data hydrated into the RAM. In this regard, for example, ad hoc graph indices can be created for data in the data lake based on the values in the query and the graph model that associates data columns. In this example, ad hoc graph indices can accordingly be created and used to hydrate the RAM during a session or on-demand (e.g., based on the query) without being defined beforehand or outside of the query session. In another example, graph indices can be created and used to hydrate the RAM in a batch process outside of a query. In an example, the indices can be created for the topology of the graph and also for the properties related to corresponding columns, as defined in the graph model metadata.

Turning now to FIGS. 1-7, examples are depicted with reference to one or more components and one or more methods that may perform the actions or operations described herein, where components and/or actions/operations in dashed line may be optional. Although the operations described below in FIGS. 4-6 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, in combination, execute the respective subset of instructions to accomplish performing actions X, Y, and Z. Alternatively, three processors may access one of three different memories each storing one of instructions for performing X, Y, or Z, and the three processor may in combination execute the respective subset of instruction to accomplish performing actions X, Y, and Z. Alternatively, a single processor may execute the instructions stored on a single memory, or distributed across multiple memories, to accomplish performing actions X, Y, and Z.

FIG. 1 is a schematic diagram of an example of a device 100 (e.g., a computing device) for performing functions related to generating, querying, or otherwise utilizing a graph model over data stored in a repository in a common data format, in accordance with aspects described herein. In an example, device 100 can include one or more processors 102 and/or memory/memories 104 configured to execute or store instructions or other parameters related to providing an operating system 106, which can execute one or more applications or processes. For example, processor(s) 102 and memory/memories 104 may be separate components communicatively coupled by a bus (e.g., on a motherboard or other portion of a computing device, on an integrated circuit, such as a system on a chip (SoC), etc.), components integrated within one another (e.g., processor(s) 102 can include the memory/memories 104 as an on-board component), and/or the like. Memory/memories 104 may store instructions, parameters, data structures, etc. for use/execution by processor(s) 102 to perform functions described herein. In another example, processor(s) 102 and/or memory/memories 104 can be distributed over multiple devices or physical computing nodes in a network (e.g., in a cloud-based computing platform) for providing the functions of the various components described herein.

In one example, the operating system 106 can execute one or more applications or processes, such as, but not limited to, a graph engine 110 for generating one or more graphs over data stored in a repository 142 in a common data format and/or for populating or hydrating one or more graph indices with data from the repository 142 based on the one or more graphs. In an example, device 100 can communicate with the repository 142 over one or more networks 140 for obtaining data stored in the repository 142. In one example, the repository 142 may be included in the device 100 and/or the device 100 may include various distributed resources, as described above, which may include the repository 142. In accordance with some aspects described herein, the repository 142 can include a data lake that can store data from a variety of different sources that may be of various source types, such as structured data sources (e.g., database tables, spreadsheets, etc.), semi-structured data sources (e.g., extensible Markup Language (XML) files, webpages, etc.), unstructured data sources (images, audio files, tweets, etc.), and/or the like, as described. In an example, repository 142 can store the data in the data lake in a common data format, such as a parquet format (e.g., delta, Hudi, Iceberg, etc.).

For example, the graph engine 110 may optionally include a graph modeling component 112 for generating the one or more graphs and/or a graph index component 114 for generating, populating, or hydrating one or more graph indices for improving performing of queries executed over the one or more graphs. The operating system 106 may optionally execute a graph query component 116 for executing a graph query over the one or more graphs without requiring copying or ETL of the data in the repository 142 and/or a graph algorithm component 118 for executing a graph algorithm over the one or more graphs without requiring copying or ETL of the data in the repository 142. A graph query may include a query for data stored in the repository 142, and a graph algorithm may include a request for information about the graph (e.g., information to manipulate or analyze the graph itself), such as node search or traversal, centrality, community detection, similarity, path finding, directed acyclic graph (DAG) algorithms, node embeddings, topological link prediction, etc.

In an example, graph modeling component 112 can generate one or more graph models 120 in memory/memories 104 as metadata that defines columns in the data as vertices, relationships between the columns as edges between the vertices, and/or other columns in the data in the repository 142 as properties of a vertex. Based on a graph model 120, graph index component 114 can generate one or more indexing structures 122, as described further herein, to improve efficiency of graph queries executed over the data and based on the graph model(s) 120. In an example, graph index component 114 can create or populate the indexing structure(s) 122 as an offline or batch process based on associated graph model(s) 120, and/or can update the indexing structure(s) 122 as new data is stored in the repository 142. In another example, graph index component 114 can create or populate the indexing structure(s) 122 based on a received query request, which can include creating the indexing structure(s) 122 to include columns specified in the query and/or columns indicated in the graph model(s) 120 as properties of, or having a relationship (e.g., edge) with, the columns specified in the query.

In some examples, graph modeling component 112 may optionally include an interface component 130 for providing an interface (e.g., a GUI on a display device) for allowing specifying the graph model(s) 120. In accordance with some aspects described herein, the interface component 130 may obtain a structure or data (or a schema of data) stored in the repository 142, such as a list of data sources, a list of table, columns, or other data constructs in the data sources, etc., and can display the structure or schema on an interface. Interface component 130, in some examples, may enable selection (e.g., by a user using the GUI) of columns of data from the data sources (e.g., as vertices in a graph), specification of relationships between the columns (e.g., as edges between vertices in the graph), specification of properties of the columns (e.g., as a property of a corresponding vertex), etc. In an example, based on a graph representation created using the interface component 130, column associating component 132 can generate the corresponding metadata defining the graph model(s) 120 to indicate the associations between the columns or other constructs of data stored in the repository 142 (e.g., as a list of vertices corresponding to columns, a list of edges between the columns, a list of properties for one or more of the vertices and/or one or more of the edges, etc.), as described herein.

In addition, for example, a client device 144 can access the device 100, e.g., via network 140, to utilize one or more interfaces provided by the interface component 130 to generate the graph model(s) 120. In another example, the client device 144 can access the device 100 to provide query requests for queries and/or requests for algorithms to be performed over the graph model(s) 120, as described herein.

Figure 2:
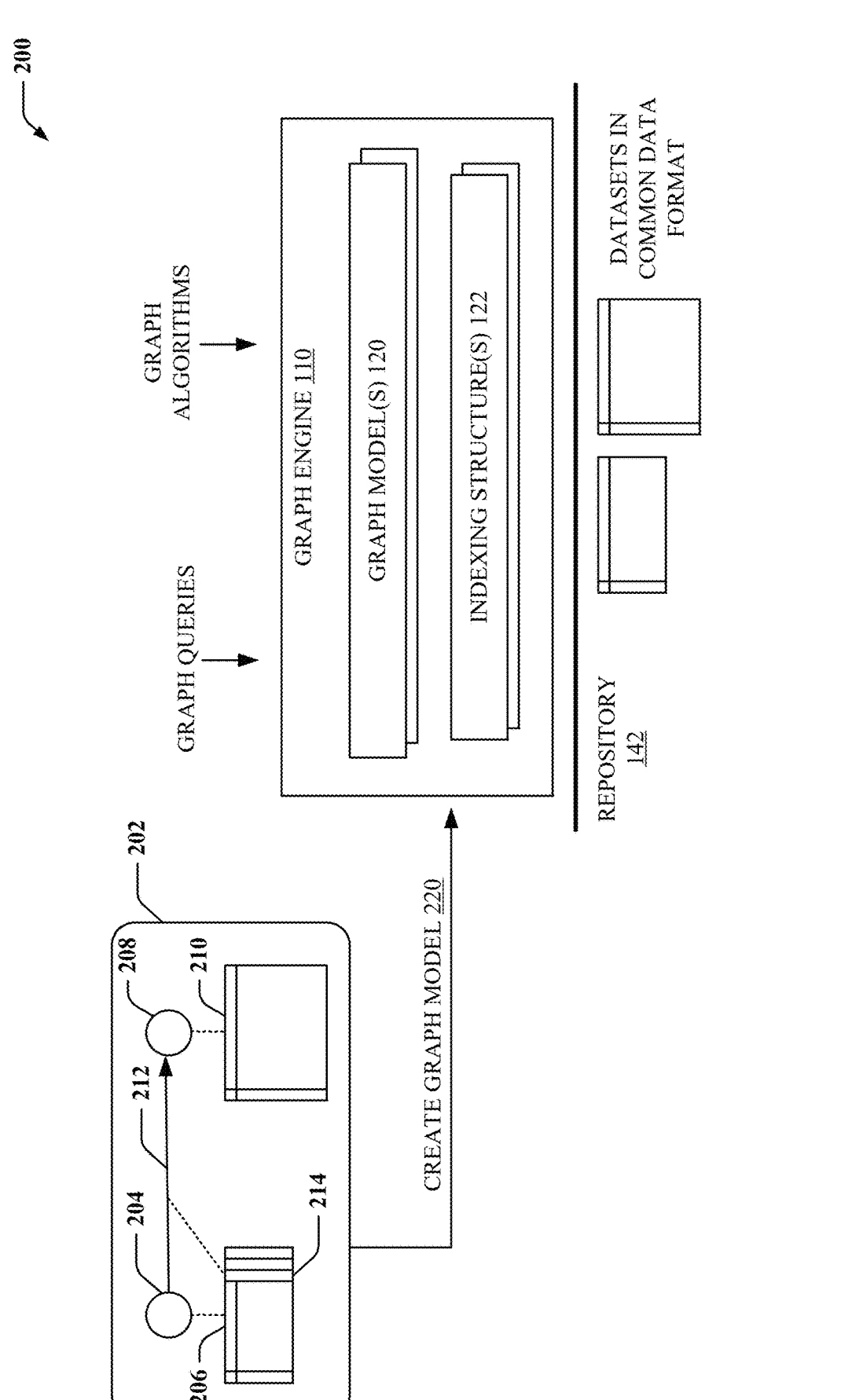
FIG. 2 illustrates a schematic diagram of an example of a system for creating graph models of data stored in a repository, in accordance with aspects described herein.

FIG. 2 illustrates a schematic diagram of an example of a system 200 for creating graph models of data stored in a repository 142, in accordance with aspects described herein. System 200 may include a graph engine 110 for generating one or more graph models 120 and/or one or more indexing structures 122 for datasets stored in a repository 142 (e.g., data lake) according to a common data format, as described above. For example, graph engine 110 can obtain a structure or schema of the data stored in repository 142 and may present the structure or schema via an interface to allow for creating a representation 202 of a graph model 120. For example, representation 202 may include a vertex 204 corresponding to one or more columns in a table 206 of data stored in repository 142 and a vertex 208 corresponding to a different one or more columns in a different table 210 of data stored in repository 142. In addition, representation 202 may include an edge 212 between the vertices 204 and 208 indicating a relationship between the vertices 204 and 208. Moreover, in an example, representation 202 may indicate a property of the edge 212 corresponding to column 214 in the table 206, etc. In an example, at 220, a graph model can be created from the representation 202 and stored as one or more graph models 120.

In this regard, for example, the graph model(s) 120 can be based on a schema of graph models, $S_{pg}$, which may include the types of vertices that can be in the graph, the set of labels that a vertex of a given type can have, the set of properties, which are (key, value) pairs, that a vertex of a given type can have, the types of edges, linking pairs of vertices, that can exist in the graph, the set of labels that an edge of a given type can have, and/or the set of properties, which are (key, value) pairs, that an edge of a given type can have.

In addition, a source-of-truth (SoT) dataset can exist in the original data that is imported into the repository 142 that are stored in a data lake in an updatable column-oriented table format based on Parquet (e.g., delta, Hudi and Iceberg). M(SoT, $S_{pg}$) can be defined as a mapping from the SoT datasets to $S_{pg}$. M(SoT, $S_{pg}$) can indicate the columns in the SoT datasets that include the vertices and their properties. Each row in a dataset can include a vertex and its associated set of property values; the names of the columns with the properties (or a transformation thereof) can be the property keys. Moreover, the mapping can indicate a pair of columns representing the relations (edges) between source and target vertices and the columns with the edge properties, as described above and further herein. In any case, as described, the graph model(s) 120 can be created without copying or performing ETL of the data stored in the repository 142.

With the graph model(s) 120 created, graph engine 110 can generate indexing structure(s) 122 for the graph model(s) 120 to improve query performance over the graph model(s) 120 and corresponding data stored in repository 142. For example, graph engine 110 can generate the indexing structure(s) 122 based on the metadata of the corresponding graph model(s) 120 (e.g., based on the columns corresponding to the vertices, edges, or properties indicated in the graph model(s) 120), which may be an offline or batch process (e.g., a periodically triggered process that is not based on a query). In another example, graph engine 110 can generate the indexing structure(s) 122 based on a received query (e.g., based on columns specified in the query and/or corresponding columns connected to those specified in the query as edges or properties in the graph model(s) 120, etc.).

In an example, graph engine 110 can create different indexing structures with different performance and cost characteristics. Depending on the workload, performance requirements, and target operational cost of the graph model(s) 120 for example, the graph engine 110 (e.g., as part of a Software-as-a-Service (SaaS) platform) may automatically choose the indexing structure(s) 122 to be used. Alternatively, (e.g., in a Platform-as-a-Service (PaaS) environment) a customer that stores the data in repository 142 can decide or indicate what indexing structure(s) 122 to use. In addition, for example, the graph engine 110 can implement a triple store functionality, which can store triples in the form of subject-predicate-object (SPO). As such, graph engine 110 can determine to use all or some of the following combinations to index the triples as [key]→{value}:

$$[S] \rightarrow \{P, O\}$$

$$[S, P] \rightarrow \{O\}$$

$$[O] \rightarrow \{P, S\}$$

$$[O, P] \rightarrow \{S\}$$

$$[P] \rightarrow \{S, O\}$$

$$[S, P, O] \rightarrow \{\}$$

In addition, graph engine 110 can implement tree-like indexing structures to assist the processing of graph queries and graph computations that perform filtering on property values. Each node in such an indexing structure 122 can maintain references to the associated vertices (e.g., to numerical identifiers that represent the vertices). In an example, graph engine 110 may also partition the indexing structures across multiple computers to scale out with the graph size and the traffic load.

In an example, graph engine 110 may populate the indices or indexing structures 122 as follows. First, graph engine 110 may scan the SoT tabular datasets that, according to the mapping M(SoT, $S_{pg}$), include vertices. Each dataset can include a column with the original identifying fields for vertices. Graph engine 110 can assign a unique numerical identifier (e.g., a 64-bit unsigned integer) to each vertex in the dataset. Graph engine 110 can maintain a forward and inverse mapping ($M_{orig-to-vid}$) between each original vertex identifying field and an internal numerical identifier. Graph engine 110 can store the mapping in the data lake, in some examples, and/or can temporarily store a local copy for efficient access while the indices are populated. In one example, graph engine 110 may retain the local copy (e.g., in secondary storage or one or more memories 104) to improve performance of graph queries or compute that return original vertex identifying fields.

The mapping $M(SoT, S_{pg})$ can also indicate that a SoT dataset includes, in addition to vertices, columns with the properties of the vertices. In this example, graph engine 110 can scan such tabular datasets, not only to retrieve the original vertex identifying fields, but also the vertex properties. Depending on the workload, performance requirements, and target operational cost, graph engine 110 can determine to populate different indexing structures for the vertex properties. The vertex properties can be indexed as SPO triples, where an internal numerical identifier of a vertex can be the subject, the property's key can be the predicate, and the property's value can be the object. In this example, the property's key, which can be a text string, can also be assigned an internal numerical identifier. This indexing structure can facilitate the access to specific properties from a given set of vertices, to vertices whose properties have a given value, and to vertices whose properties have a given key. Additionally, graph engine 110 can index the vertex properties in tree-like data structures to accelerate the filtering of vertices on given ranges for their property values.

Once the graph engine 110 populates the indexing structure(s) 122 for vertices and properties indicated in the graph model(s) 120, it can also populate the indexing structure(s) 122 for edges and their properties. Similarly, graph engine 110 can scan the SoT tabular datasets that, according to the mapping $M(SoT, S_{pg})$, include edges and their properties. For example, graph engine 110 can generate the indexing structure(s) 122 to represent directed edges, from a source vertex to a target vertex, with the internal numerical identifiers assigned to the vertices. In addition, for example, edge types, which can be indicated as a text string, can be also assigned internal numerical identifiers. Thus, graph engine 110 can also use the mapping $M_{orig-to-vid}$ to populate the indexing structures for edges. In addition, for example, graph engine 110 can store edges as SPO triples, as described. For example, the internal identifier of the source vertex can be the subject, the identifier of the edge's type can be the predicate, and the identifier of the target vertex can be the object.

In addition, for example, when the mapping $M(SoT, S_{pg})$ indicates that a SoT dataset includes, in addition to edges, columns with the properties of the edges, graph engine 110 can retrieve the original identifying fields of the source and destination vertices that make up the edges, and also the properties of the edges. Depending on the customer's workload, performance requirements, and target operational cost, graph engine 110 can determine to populate different indexing structures 122 for the edges and their properties. In an example, a graph may have many more edges than vertices. For example, graph engine 110 can store edges as SPO triples and assign a unique numerical identifier to each edge (e.g., an identifier specific for edges or the concatenation of the identifiers of the elements S, P, and O). Undirected edges, represented as a pair of reciprocal directed edges, may be given the same identifier. Then, graph engine 110 can index the edge properties as SPO triples as well, where the edge internal identifier can be the subject, the property's key can be the predicate, and the property's value can be the object. Moreover, in this example, graph engine 110 can use indexing structures as those for vertex properties.

In another example, graph engine 110 can index the edges and their properties as a set of tables. For each type of edge, there can be a table whose key is formed by the columns with the identifiers of both the source vertex and the target vertex. Other columns in the table can include the edge properties; the name of each column can be the property's key and the value in the edge's row can be the property's value for the edge. While also tabular, the tables for edges with properties may be more compact when compared to the SoT tabular datasets, as the keys and non-primitive-numerical values of properties have been replaced by numerical identifiers. When the values of an edge property are of a primitive numerical type, graph engine 110 can generate the indexing structure(s) 122 to store the values as they are (e.g., as inline values). In this example, graph engine 110 can also augment the edge tables with secondary indices for such property values.

In an example, graph engine 110 can store the indexing structure(s) 122 in memory/memories 104 (e.g., in random access memory (RAM)), in secondary storage devices (e.g., solid-state drives (SSDs)), or in the data lake (e.g., in repository 142), etc. These options can allow the graph engine 110 to operate at different performance-price points (e.g., machine sizes and count) for a given customer.

Figure 3:
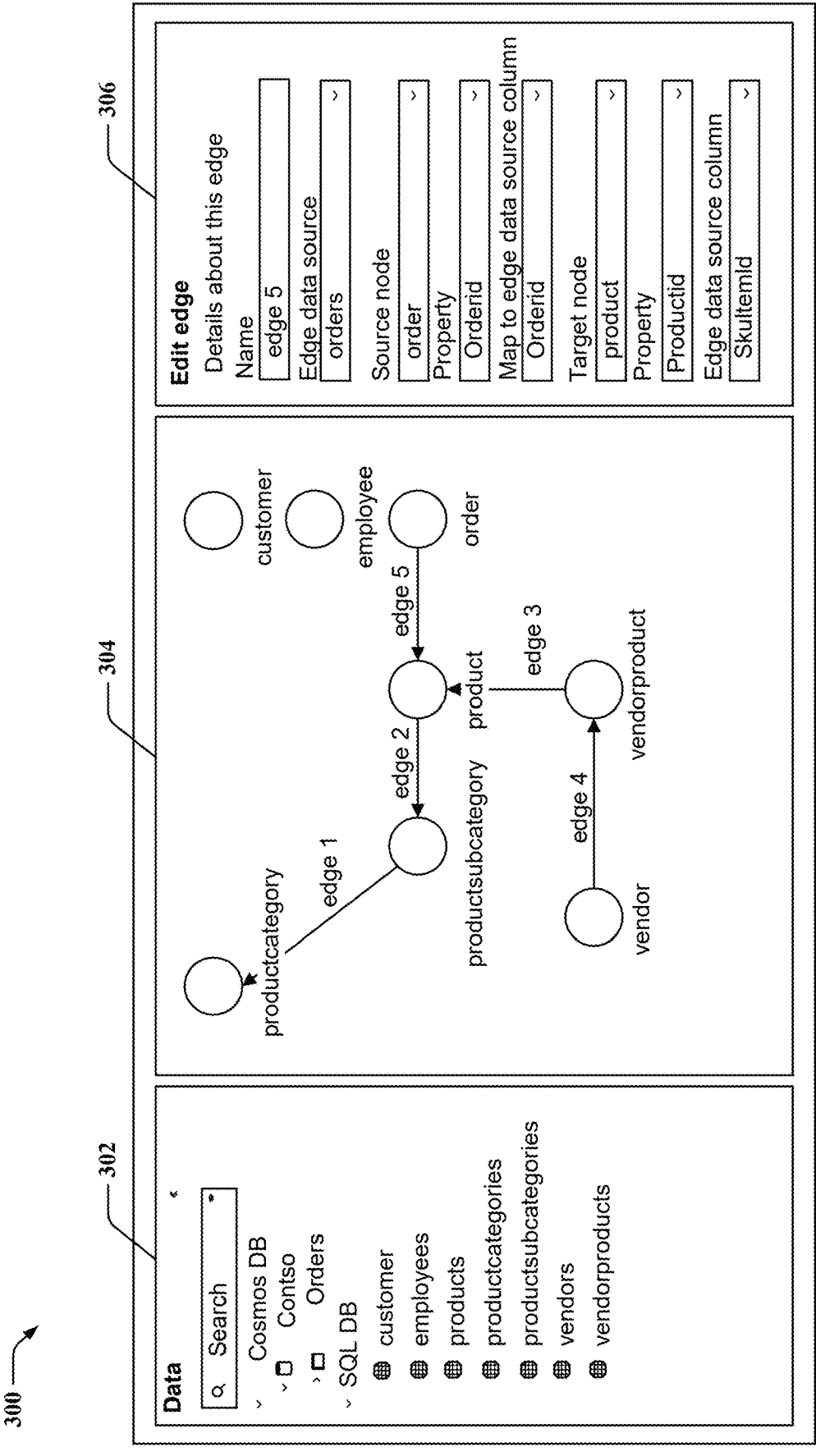
FIG. 3 illustrates an example of an interface for facilitating creating a visual representation of a graph model for data stored in a repository according to a common data format, in accordance with aspects described herein.

FIG. 3 illustrates an example of an interface 300 for facilitating creating a visual representation of a graph model for data stored in a repository according to a common data format, in accordance with aspects described herein. Interface 300 can be displayed on a display device via interface component 130, as described above, to allow a user of the interface to specify a representation of a graph model 120 to be constructed for the data stored in repository 142 (e.g., a data lake). Interface 300 can include a data section 302 or pane that lists available data sources in the repository 142 (e.g., for a certain customer using the interface), which may include Cosmos DB and SQL DB in the depicted example. Data section 302 may allow for expanding the data sources to list additional sources, tables, etc., such as an Orders table in a Consto data source of Cosmos DB, or customer, employees, products, etc., tables in SQL DB. Though not shown in interface 300, based on selecting a table, a list of available columns can be displayed, allowing for selection of one or more of the columns as vertices. Once selected, the vertex can be displayed in a model section 304 or pane.

In model section 304, the vertices can be displayed and/or moved around. Selection of a vertex may cause display of a Edit vertex section or pane (not shown) for specifying details of the vertex, such as a vertex name, a column in a table to which the vertex is mapped, one or more other columns in the table or another table or another data source that can be considered a property of the vertex, etc. In the depicted example, model section 304 can include vertices for productcategory, productsubcategory, product, order, vendorproduct, vendor, etc. In addition, model section 304 can allow for specifying edges between the vertices, which can represent a relationship between the vertices. As shown, for example, product can have an edge from order and an edge to productsubcategory. Selecting an edge may cause the interface 300 to display an Edit edge section 306 or pane to enable specifying additional details of the edge, such as a name, edge data source, the source and target nodes, properties of the edge, etc. Based on the representation created using interface 300 provided by interface component 130, for example, column associating component 132 can generate the metadata defining a corresponding graph model 120 based on associating the columns as a list of vertices, a list of edges, properties thereof, etc., as described above.

FIG. 4 is a flowchart of an example of a method 400 for creating a graph model over data stored in a data repository according to a common data format, in accordance with aspects described herein. For example, method 400 can be performed by a device 100 and/or one or more components thereof to facilitate generating a graph model over data stored in the data repository, such as a data lake, without requiring ETL of the data to another table or other data structure, as described herein.

In method 400, optionally at action 402, an interface indicating tables or columns of data stored in a repository in a common data format can be provided. In an example, interface component 130, e.g., in conjunction with processor (s) 102, memory/memories 104, operating system 106, graph engine 110, graph modeling component 112, etc., can provide the interface indicating tables or columns of data stored in a repository (e.g., repository 142, which may include a data lake) in a common data format (e.g., a Parquet format). For example, interface component 130 can generate the interface and/or provide the interface for display on a display device or other output device of the device 100. The interface may include an interface such as interface 300 shown in FIG. 3 to allow a user to define a visual representation of a graph model, which can be converted or translated into a graph model 120 for storing in memory/memories 104 of the device 100. In an example, the interface provided by the interface component 130 can allow for indicating certain columns in tables as vertices of the graph and for defining edges between vertices as relationships between the columns of data, as well as other columns as properties for the vertices and/or edges, as described herein.

In method 400, at action 404, a selection of columns or data stored in the common data format that are to be associated with one another can be obtained. In an example, column associating component 132, e.g., in conjunction with processor(s) 102, memory/memories 104, operating system 106, graph engine 110, graph modeling component 112, etc., can obtain the selection of columns of data stored in the common data format that are to be associated with one another. For example, column associating component 132 can receive the selection of columns from the interface component 130, e.g., based on a graphical representation generated using an interface provided by the interface component 130. For example, the graphical representation can indicate associations between columns of data and vertices in a graph, as well as edges between the vertices, properties of the vertices defined by other columns, etc. For example, interface component 130 may indicate a list of vertices associated with columns, a list of edges between vertices, a list of properties associated with one or more of the vertices, and/or the like, as described above.

In an example, in obtaining the selection of columns of data at action 404, optionally at action 406, the selection of columns indicated as vertices or indicated as properties of vertices can be obtained, and/or at action 408, an indication of edges between two or more vertices indicating the association between the corresponding columns of data can be obtained. In an example, column associating component 132, e.g., in conjunction with processor(s) 102, memory/ memories 104, operating system 106, graph engine 110, graph modeling component 112, etc., can obtain the selection of columns indicated as vertices or indicated as properties of the vertices, or can obtain the indication of edges between two or more vertices indicating the association between the corresponding columns of data. For example, referring to interface 300 in FIG. 3, column associating component 132 can obtain, from the graphical representation created using interface 300 provided by interface component 130, the list of vertices including productcategory, productsubcategory, product, order, vendorproduct, vendor, etc., and corresponding properties, as well as the list of edges including edge 1 between productcategory and productsubcategory, edge 2 between productsubcategory and product, edge 3 between vendorproduct and product, edge 4 between vendor and vendorproduct, edge 5 between order and product, and corresponding properties, etc.

In method 400, at action 410, a graph model including metadata that defines a list of vertices corresponding to at least a portion of the columns and a list of edges between two or more of the vertices identifying a relationship between corresponding columns can be created. In an example, graph modeling component 112, e.g., in conjunction with processor(s) 102, memory/memories 104, operating system 106, graph engine 110, etc., can create, based on the selection obtained by the column associating component 132, the graph model (e.g., graph model 120) including metadata that defines the list of vertices corresponding to at least a portion of the columns and the list of edges between two or more of the vertices identifying the relationship between corresponding columns. For example, graph modeling component 112 can define the metadata that defines the graph model 120 corresponding to a graph model representation created using an interface provided by interface component 130, such as interface 300. In this regard, the metadata defining graph model 120 can indicate the vertices corresponding to columns of data stored in the repository 142 and corresponding information, such as vertex name, column, table, database, etc. of the corresponding column, and/or the like. In addition, in this regard, metadata defining graph model 120 can indicate the edges as an association between vertices, and corresponding information, such as edge name, source vertex, target vertex, etc.

In an example, in creating the graph model at action 410, optionally at action 412, the graph model including metadata that also defines one or more properties for one or more vertices in the list of vertices or one or more edges in the list of edges can be created based on the selection. In an example, graph modeling component 112, e.g., in conjunction with processor(s) 102, memory/memories 104, operating system 106, graph engine 110, etc., can create, based on the selection, the graph model (e.g., graph model 120) including metadata that also defines one or more properties for one or more vertices in the list of vertices or one or more edges in the list of edges. In this regard, for example, metadata defining graph model 120 can indicate the columns of tables that are properties of vertices or edges in the list of vertices or edges, etc. based on identifying the column as part of metadata for the vertices or edges. Thus, as described, the graph model 120 can be created over the data as it is stored in the repository 142 without ETLing the data to another table or graph database. In accordance with various aspects described herein, queries and/or graph algorithms can also be performed over the graph model 120 without ETLing the data.

FIG. 5 is a flowchart of an example of a method 500 for populating a graph index corresponding to one or more graph models for executing queries on the one or more graph models, in accordance with aspects described herein. For example, method 500 can be performed by a device 100 and/or one or more components thereof to facilitate populating or hydrating the graph index, as described herein.

In method 500, at action 502, a graph index in memory can be populated, based at least in part on the graph model, with first data in a first column that corresponds to a first vertex in the list of vertices and second data in a second column that corresponds to a second vertex in the list of vertices based at least in part on one of an edge in the list of edges that is between the first vertex and the second vertex. In an example, graph index component 114, e.g., in conjunction with processor(s) 102, memory/memories 104, operating system 106, graph engine 110, etc., can populate, based at least in part on the graph model (e.g., graph model 120), the graph index (e.g., index structure(s) 122) in memory (such as memory/memories 104, memory of a secondary storage device that is locally coupled with device 100 via an interface, remotely coupled with device 100 over a network, etc.) with first data in the first column of data stored in the repository 142 that corresponds to the first vertex in the list of vertices in the graph model and second data in the second column that corresponds to the second vertex in the list of vertices based at least in part on the edge in the list of edges that is between the first vertex and the second vertex. Referring to the interface 300 in FIG. 3, for example, graph index component 114 can populate an index structure 122 with data from productcategory and data from productsubcategory based on edge 1 in the graph model 120 created from the graph representation in interface 300, and/or data from the other vertices based on the list of vertices and edges, etc.

In method 500, at action 504, the graph index in memory can be populated, based at least in part on the graph model, with third data in a third column based at least in part on the third column being indicated, in the graph model, as a property for the first vertex, the second vertex, or the edge. In an example, graph index component 114, e.g., in conjunction with processor(s) 102, memory/memories 104, operating system 106, graph engine 110, etc., can populate, based at least in part on the graph model (e.g., graph model 120), the graph index (e.g., index structure(s) 122) in memory/memories 104 with third data in the third column of data stored in the repository 142 based at least in part on the third column being indicated, in the graph model 120, as a property for the first vertex, the second vertex, or the edge.

As described above, for example, graph index component 114 can populate the index structure(s) 122 with data from the repository 142 as SPO data, such as SPOs defining vertices, SPOs defining edges, SPOs defining properties, etc., as described above. For example, graph index component 114 can populate the index structure(s) 122 with nodes including a vertex for each data record in a column that has an edge to another data record in another column, which can include creating an identifier for each edge, as described, and/or SPOs that define the edges between the vertex identifiers. Similarly, for example, graph index component 114 can populate the index structure(s) 122 with property values for vertices using data from another column, which can include creating SPOs that define the property values for the vertices. As described above, graph index component 114 can populate the index structure(s) 122 as periodic or event-drive batch process or based on a received query request.

Thus, in one example in method 500, optionally at action 506, the graph index can be updated based on additional data added to the data stored in the column data format having a column indicated in the graph model. For example, graph index component 114, e.g., in conjunction with processor(s) 102, memory/memories 104, operating system 106, graph engine 110, etc., can update the graph index (e.g., index structure(s) 122) based on the additional data added to the data stored in the common data format (e.g., added to repository 142) having a column indicated in the graph model 120. In this regard, for example, graph index component 114 can update the index structure(s) 122 to include new nodes or vertices, new data from columns associated with properties, etc. periodically or based on detecting new data being added to the repository 142.

In method 500, optionally at action 508, a query request can be received that indicates a query to be executed over data in the repository. In an example, graph query component 116, e.g., in conjunction with processor(s) 102, memory/memories 104, operating system 106, etc., can receive (e.g., via a client device 144) a query request indicating a query to be executed over data in the repository 142, or based on one or more of the graph model(s) 120. For example, the query request can indicate a natural language query, a query in a structured query language, etc. that indicates one or more columns of data to be queried. The one or more columns of data can have been indicated as a vertex in the graph model(s) 120, as described. In one example, graph index component 114 can populate the index structure(s) 122 based on the query to include data from columns indicated in the query, data from columns indicated as having an edge to the columns indicated in the query, data from columns indicated as properties to columns indicated in the query, etc., where the index structure(s) 122 can include SPOs describing connections between the vertices/nodes of data, as described.

In method 500, optionally at action 510, the query can be executed based on the graph index. In an example, graph query component 116, e.g., in conjunction with processor(s) 102, memory/memories 104, operating system 106, etc., can execute the query based on the graph index (e.g., index structure(s) 122), which can include collecting query results based on requested values for column data indicated in the query, other column data related thereto (e.g., as indicated in the graph model(s) 120 and accordingly populated in the index structure(s) 122), etc.

In method 500, optionally at action 512, the query request can be returned. In an example, graph query component 116, e.g., in conjunction with processor(s) 102, memory/memories 104, operating system 106, etc., can return results of the query (e.g., to the client device 144), which may be in response to the query request.

FIG. 6 is a flowchart of an example of a method 600 for executing a graph algorithm for the one or more graph models, in accordance with aspects described herein. For example, method 600 can be performed by a device 100 and/or one or more components thereof, as described herein.

In method 600, optionally at action 602, a request to execute a graph algorithm can be received. In an example, graph algorithm component 118, e.g., in conjunction with processor(s) 102, memory/memories 104, operating system 106, etc., can receive (e.g., from a client device 144) a request to execute a graph algorithm. For example, the graph algorithm indicated in the request can include a request for information about the graph (e.g., information to manipulate or analyze the graph itself), such as node search or traversal, centrality, community detection, similarity, path finding, DAG algorithms, node embeddings, topological link prediction, etc., as described.

In method 600, optionally at action 604, a graph index in memory can be populated, based at least in part on the graph model, with first data in a first column that corresponds to a first vertex in the list of vertices and second data in a second column that corresponds to a second vertex in the list of vertices based at least in part on one of an edge in the list of edges that is between the first vertex and the second vertex. In an example, graph index component 114, e.g., in conjunction with processor(s) 102, memory/memories 104, operating system 106, graph engine 110, etc., can populate, based at least in part on the graph model (e.g., graph model 120), the graph index (e.g., index structure(s) 122) in memory/memories 104 with first data in the first column of data stored in the repository 142 that corresponds to the first vertex in the list of vertices in the graph model and second data in the second column that corresponds to the second vertex in the list of vertices based at least in part on the edge in the list of edges that is between the first vertex and the second vertex, as described in action 502 of method 500 in FIG. 5 above.

In method 600, optionally at action 606, the graph index in memory can be populated, based at least in part on the graph model, with third data in a third column based at least in part on the third column being indicated, in the graph model, as a property for the first vertex, the second vertex, or the edge. In an example, graph index component 114, e.g., in conjunction with processor(s) 102, memory/memories 104, operating system 106, graph engine 110, etc., can populate, based at least in part on the graph model (e.g., graph model 120), the graph index (e.g., index structure(s) 122) in memory (such as memory/memories 104, memory of a secondary storage device that is locally coupled with device 100 via an interface, remotely coupled with device 100 over a network, etc.) with third data in the third column of data stored in the repository 142 based at least in part on the third column being indicated, in the graph model 120, as a property for the first vertex, the second vertex, or the edge, as described in action 504 of method 500 in FIG. 5 above. As described above, graph index component 114 can populate the index structure(s) 122 as periodic or event-drive batch process or based on a received graph algorithm request.

Thus, in one example in method 600, optionally at action 608, the graph index can be updated based on additional data added to the data stored in the column data format having a column indicated in the graph model. For example, graph index component 114, e.g., in conjunction with processor(s) 102, memory/memories 104, operating system 106, graph engine 110, etc., can update the graph index (e.g., index structure(s) 122) based on the additional data added to the data stored in the common data format (e.g., added to repository 142) having a column indicated in the graph model 120. In this regard, for example, graph index component 114 can update the index structure(s) 122 to include new nodes or vertices, new data from columns associated with properties, etc. periodically or based on detecting new data being added to the repository 142.

In method 600, at action 610, the graph algorithm can be executed based on the graph model. In an example, graph algorithm component 118, e.g., in conjunction with processor(s) 102, memory/memories 104, operating system 106, etc., can execute the graph algorithm based on the graph model (e.g., one or more graph models 120). For example, graph algorithm component 118 can use the graph model(s) 120 to perform the requested graph algorithm using a graph index or without copying the data from the repository 142.

In executing the graph algorithm at action 610, optionally at action 612, the graph algorithm can be executed using the graph index. In an example, graph algorithm component 118, e.g., in conjunction with processor(s) 102, memory/ memories 104, operating system 106, etc., can execute the graph algorithm using the graph index (e.g., indexing structure(s) 122). For example, when executing a graph algorithm, graph algorithm component 118 can leverage the topology indices to quickly retrieve the adjacent vertices (e.g., the neighbors) of every vertex in the graph model(s) 120. This can improve the efficiency of graph traversals and vertex-centric graph algorithms in which vertices emit messages to their neighbors. In an example, graph algorithm component 118 can perform graph algorithms such as PageRank, weakly connected components, and single-source shortest paths in this regard. The indexing structure(s) 122 for vertex properties and edge properties can enable graph algorithms to filter vertices and edges that do not need to be considered. For example, considering a social network graph with dated relationships (edges) labelled as "connected_to" and "follows" between people, a person may desire to determine the shortest path between herself and the CEO of a non-profit organization, but only over the "connected_to" edges established during the last year. Graph algorithm component 118 can perform such algorithms based on the indexing structure(s) 122.

In another example, executing the graph algorithm at action 604 can include executing the graph algorithm over the data stored in the repository 142 without copying the data to a separate data store. For example, graph algorithm component 118 can use the property graph schema $S_{pg}$, the mapping $M(SoT, S_{pg})$, and possibly the filtering arguments in a graph algorithm, such as in the example above, get the shortest path but only over the "connected_to" edges established now ( )-365 days. In this example, graph algorithm component 118 can read the SoT datasets in the data lake, and produce DataFrames with only the data (rows and columns) specified by the mapping $M(SoT, S_{pg})$ and the algorithm's filtering arguments.

In the example described above regarding a social network, graph algorithm component 118 would only need to create a DataFrame called "People" with the people's identifiers (vertices) and the selected subset of columns with the required vertex properties (e.g., a DataFrame with columns "vertex_id", "v_property_key1", "v_property_key2", . . . ). In this example, graph algorithm component 118 would also create the DataFrame called "Connections" with the "connected_to" edges between a pair of people and the selected subset of edge properties (e.g., a DataFrame with columns "source", "target", "e_property_key1", "e_property_key2", . . . ). From the example, given a property of the "connected_to" edges "created_at"; then, graph algorithm component 118 can include in the "Connections" DataFrame edges for which "created_at">=now ( )-365 d. With the DataFrames in place, graph algorithm component 118 can run graph algorithms on top of them. The graph algorithms can be implemented as SQL-based iterative programs, which can include iterative computational loops (i.e., while and for loops) containing SQL statements. For example, the single-source single-target (s-t) shortest path algorithm can be implemented as a sequence of join, projection, selection, and union operations in a loop. For example, a DataFrame can be a distributed collection of rows and columns including an immutable set of records organized into named columns. Also, graph algorithm component 118 can read the SoT datasets and create, either lazily or eagerly, the DataFrames.

In method 600, at action 614, a result of executing the graph algorithm can be returned. In an example, graph algorithm component 118, e.g., in conjunction with processor(s) 102, memory/memories 104, operating system 106, etc., can return a result of executing the graph algorithm (e.g., to client device 144), which may be based on the request. The result may include an indication of data from the repository 142 or an indication about data in the repository 142, an acknowledgement that the algorithm was executed, etc.

Figure 7:
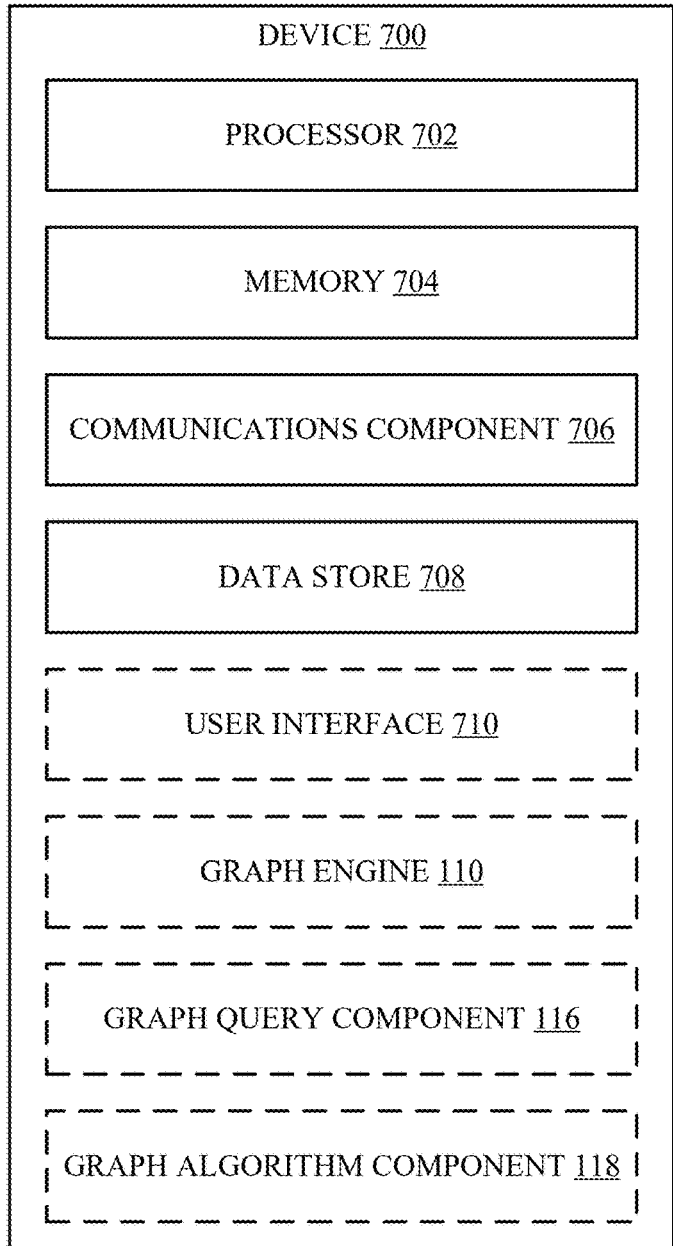
FIG. 7 is a schematic diagram of an example of a device for performing functions described herein, in accordance with aspects described herein.

FIG. 7 illustrates an example of device 700 including additional optional component details as those shown in FIG. 1. In one aspect, device 700 may include processor 702, which may be similar to processor(s) 102 for carrying out processing functions associated with one or more of components and functions described herein. Processor 702 can include a single or multiple set of processors or multi-core processors. Moreover, processor 702 can be implemented as an integrated processing system and/or a distributed processing system.

Device 700 may further include memory 704, which may be similar to memory/memories 104 such as for storing local versions of operating systems (or components thereof) and/or applications being executed by processor 702, such as a graph engine 110, graph query component 116, graph algorithm component 118, etc. Memory 704 can include a type of memory usable by a computer, such as random access memory (RAM), read only memory (ROM), tapes, magnetic discs, optical discs, volatile memory, non-volatile memory, and any combination thereof.

Further, device 700 may include a communications component 706 that provides for establishing and maintaining communications with one or more other devices, parties, entities, etc. utilizing hardware, software, and services as described herein. Communications component 706 may carry communications between components on device 700, as well as between device 700 and external devices, such as devices located across a communications network and/or devices serially or locally connected to device 700. For example, communications component 706 may include one or more buses, and may further include transmit chain components and receive chain components associated with a wireless or wired transmitter and receiver, respectively, operable for interfacing with external devices.

Additionally, device 700 may include a data store 708, which can be any suitable combination of hardware and/or software, that provides for mass storage of information, databases, and programs employed in connection with aspects described herein. For example, data store 708 may be or may include a data repository for operating systems (or components thereof), applications, related parameters, etc.) not currently being executed by processor 702. In addition, data store 708 may be a data repository for graph engine 110, graph query component 116, graph algorithm component 118, etc., and/or one or more other components of the device 700.

Device 700 may optionally include a user interface component 710 operable to receive inputs from a user of device 700 and further operable to generate outputs for presentation to the user. User interface component 710 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 710 may include one or more output devices, including but not limited to a display, a speaker, a haptic feedback mechanism, a printer, any other mechanism capable of presenting an output to a user, or any combination thereof.

In addition, user interface component 710 may provide output of, and/or provide a mechanism to received input on, interfaces generated by interface component 130 (e.g., interface 300).

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly included and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A device for creating a graph model for data obtained from multiple data sources and stored in a common data format, comprising:

one or more memories storing instructions; and one or more processors coupled to the one or more memories and configured to execute the instructions to:

obtain a selection of columns of data stored in a first data store in the common data format that are to be associated with one another in the graph model;

create, based on the selection and without copying the data from the columns to a second data store that is different from the first data store, a graph model including metadata that defines a list of vertices corresponding to at least a portion of the columns and a list of edges between two or more vertices in the list of vertices identifying a relationship between corresponding columns;

receive a query request for a query to execute over the data stored in the first data store;

populate, based on the graph model and the query request, a graph index, stored in the one or more memories, with:

first data in a first column, indicated in the query request, that corresponds to a first vertex in the list of vertices; and second data in a second column, indicated in the query request, that corresponds to a second vertex in the list of vertices, wherein populating the graph index with the first data and the second data is based on one of an edge in the list of edges that is between the first vertex and the second vertex; and perform the query over the graph model of the data as stored in the common data format and based on the graph index.

2. The device of claim 1, wherein the one or more processors are configured to execute the instructions to create the graph model including specifying, in metadata defining the graph model and based on the selection, at least one of the portion of the columns as a property for at least one vertex in the list of vertices or for at least one edge in the list of edges.

3. The device of claim 1, wherein the one or more processors are configured to execute the instructions to populate, based on the graph model, the graph index stored in the one or more memories with third data in a third column based on the third column indicated, in the graph model, as a property for the first vertex.

4. The device of claim 1, wherein the one or more processors are configured to execute the instructions to update the graph index based on additional rows of data added to the data stored in the common data format and having at least the first column or the second column indicated in the graph model.

5. The device of claim 1, wherein the one or more processors are configured to execute the instructions to populate the graph index based on receiving the query indicating at least the first column in the query.

6. The device of claim 1, wherein the one or more processors are configured to execute the instructions to return, to a graphical user interface (GUI), results of the query.

7. A computer-implemented method of creating a graph model for data obtained from multiple data sources and stored in a common data format, comprising:

creating, based on a selection of columns of data stored in a first data store in the common data format that are to be associated with one another and without copying the data from the columns to a second data store that is different from the first data store, a graph model including metadata that defines a list of vertices corresponding to at least a portion of the columns and a list of edges between two or more vertices in the list of vertices identifying a relationship between corresponding columns;

receive a query request for a query to execute over the data stored in the first data store;

populate, based on the graph model and the query request, a graph index, stored in one or more memories, with:

first data in a first column, indicated in the query request, that corresponds to a first vertex in the list of vertices; and second data in a second column, indicated in the query request, that corresponds to a second vertex in the list of vertices, wherein populating the graph index with the first data and the second data is based on one of an edge in the list of edges that is between the first vertex and the second vertex; and performing the query over the graph model of the data as stored in the common data format and based on the graph index.

8. The computer-implemented method of claim 7, wherein creating the graph model includes specifying, in metadata that defines the graph model and based on the selection, at least one of the portion of the columns as a property for at least one vertex in the list of vertices or for at least one edge in the list of edges.

9. The computer-implemented method of claim 7, further comprising populating, based on the graph model, the graph index in memory with third data in a third column based on the third column indicated, in the graph model, as a property for the first vertex.

10. The computer-implemented method of claim 7, further comprising updating the graph index as a batch process and based on additional rows of data added to the data stored in the common data format and having at least the first column or the second column indicated in the graph model.

11. The computer-implemented method of claim 7, wherein populating the graph index is based on receiving the query indicating at least the first column in the query.

12. The computer-implemented method of claim 7, further comprising returning, via a graphical user interface (GUI), results of the query.

13. One or more non-transitory computer-readable media storing instructions thereon that, when executed by at least one computing device, cause the at least one computing device to perform operations for creating a graph model for data obtained from multiple data sources and stored in a common data format, comprising:

obtaining a selection of columns of data stored in a first data store in the common data format that are to be associated with one another in the graph model;

creating, based on the selection and without copying the data from the columns to a second data store that is different from the first data store, a graph model including metadata that defines a list of vertices corresponding to at least a portion of the columns and a list of edges between two or more vertices in the list of vertices identifying a relationship between corresponding columns;

receive a query request for a query to execute over the data stored in the first data store;

populate, based on the graph model and the query request, a graph index, stored in one or more memories, with:

first data in a first column, indicated in the query request, that corresponds to a first vertex in the list of vertices; and second data in a second column, indicated in the query request, that corresponds to a second vertex in the list of vertices, wherein populating the graph index with the first data and the second data is based on one of an edge in the list of edges that is between the first vertex and the second vertex; and performing the query over the graph model of the data as stored in the common data format and based on the graph index.

14. The one or more non-transitory computer-readable media of claim 13, wherein creating the graph model includes specifying, in metadata defining the graph model and based on the selection, at least one of the portion of the columns as a property for at least one vertex in the list of vertices or for at least one edge in the list of edges.

15. The one or more non-transitory computer-readable media of claim 13, the operations further comprising populating, based on the graph model, the graph index in memory with third data in a third column based on the third column indicated, in the graph model, as a property for the first vertex.

* * * * *